United States Patent [19]
Rossum et al.

[11] Patent Number: 5,928,342
[45] Date of Patent: Jul. 27, 1999

[54] AUDIO EFFECTS PROCESSOR INTEGRATED ON A SINGLE CHIP WITH A MULTIPORT MEMORY ONTO WHICH MULTIPLE ASYNCHRONOUS DIGITAL SOUND SAMPLES CAN BE CONCURRENTLY LOADED

[75] Inventors: David P. Rossum, Monterey; Jay Scott Fuller, Scotts Valley, both of Calif.

[73] Assignee: Creative Technology Ltd., Singapore, Singapore

[21] Appl. No.: 08/887,100

[22] Filed: Jul. 2, 1997

[51] Int. Cl.[6] .................................................. G06F 13/14
[52] U.S. Cl. ........................... 710/74; 710/129; 345/302; 381/119; 704/201
[58] Field of Search ..................... 395/309, 894; 704/200, 201; 345/302; 381/119; 710/129, 74

[56] References Cited

U.S. PATENT DOCUMENTS

| | | | |
|---|---|---|---|
| 3,959,594 | 5/1976 | Srivastava | 179/15 |
| 4,855,827 | 8/1989 | Best | 358/143 |
| 5,394,152 | 2/1995 | Pieronek et al. | 342/40 |
| 5,682,890 | 11/1997 | Swift | 455/67.1 |
| 5,710,978 | 1/1998 | Swift | 455/67.1 |

*Primary Examiner*—Thomas C. Lee
*Assistant Examiner*—Albert Wang
*Attorney, Agent, or Firm*—Townsend and Townsend and Crew LLP

[57] ABSTRACT

A sound processor integrated on a single chip with multiple digital sound sample stream inputs. Each input is independently connected to separate ports of a multi-port memory. The architecture allows multiple, asynchronous digital sound sample streams to be concurrently loaded into the memory without requiring synchronization to any particular input stream.

8 Claims, 8 Drawing Sheets

I/O Interface

| | Signal | Number | Type | Drive | Max Vin | Special | Description |
|---|---|---|---|---|---|---|---|
| | JOYPB[3:3] | 4 | IN | | 5V | ST,PU | Joystick Push-button Inputs |
| | JOYCMP[3:0] | 4 | BI,OD | 8mA | 5V | ST,PU | Joystick Comparator |
| | INMIDI | 1 | IN | | 5V | ST | MIDI UART Input |
| | OUTMIDI | 1 | OUT | 4mA | | | MIDI UART Output |
| 14 { | CDROMI | 1 | IN | | 5V | ST | SPDIF Input from CD-ROM |
| 16 { | GPSPDIF | 1 | IN | | 5V | ST | General pursose SPDIF Input |
| 24 { | SPDIFO[3:0] | 4 | OUT | 4mA | | TBI | SPDIF Outputs |
| | VOLINCN | 1 | IN | | 5V | ST,PU | Volume Increment Push-Button |
| | VOLDECN | 1 | IN | | 5V | ST,PU | Volume Decrement Push-Button |
| | ZVSD | 1 | IN | | 5V | ST | Z Video Serial Data In |
| 18 { | ZVSCK | 1 | IN | | 5V | ST | Z Video Bitclock |
| | ZVLRCK | 1 | IN | | 5V | ST | Z Video Word Clock |
| | AC97BCK | 1 | IN | | 5V | ST | Bit Clock Input from AC97 CODEC |
| | AC97SDI | 1 | IN | | 5V | ST | Serial Data Input from AC97 CODEC |
| 20 { | AC97SYNC | 1 | OUT | 4mA | | TBI | Sync Output to AC97 CODEC |
| | AC97SDO | 1 | OUT | 4mA | | TBI | Serial Data Output to AC97 CODEC |
| | AC97RSTN | 1 | OUT | 4mA | | TBI | Reset Not to AC97 CODEC |
| | MIXCSN | 1 | OUT | 4mA | | TBI | Chip Select Not to V32A CODEC |
| | MIXCLK | 1 | OUT | 4mA | | TBI | Bit Clock to V32A CODEC |
| | MIXDTA | 1 | OUT | 4mA | | TBI | Serial Data to V32A CODEC |
| | EECS | 1 | OUT | 4mA | | TBI | EEPROM Chip Select |
| 46 { | EECLK | 1 | OUT | 4mA | | TBI | EEPROM Interface Bit Clock |
| 22 { | EESDO | 1 | OUT | 4mA | | TBI | Serial Host Data to EEPROM |
| | EESDI | 1 | IN | | 5V | ST | Serial Host Data from EEPROM |
| | AC3FS | 1 | IN | | 5V | ST | Frame Sync for AC3 Decoder |
| | AC3DBCK | 1 | IN | | 5V | ST | Bit Clock for Decoded Data from AC3 Decoder |
| | AC3DSD[2:0] | 3 | IN | | 5V | ST | Decoded Audio Data from AC3 Decoder |
| Modem { | PULSEN | 1 | OUT | 4mA | | TBI | DAA Connection |
| | HANDN | 1 | OUT | 4mA | | TBI | DAA Connection |
| | HOOKN | 1 | OUT | 4mA | | TBI | DAA Connection |

*SEE FIG. 3A1*

*FIG. 3A*

*SEE FIG. 3A*

| | | | | | | |
|---|---|---|---|---|---|---|
| Modem { | LCSN | 1 | IN | | 5V | DAA Connection |
| | RINGN | 1 | IN | | 5V | DAA Connection |
| 26 { | PCICLK | 1 | IN | | PCI | PCI Bus Clock |
| | PCIRSTN | 1 | IN | | PCI | PCI Bus Reset Active low. |
| | CLKRUNN | 1 | BI | PCI | PCI | PCI Dynamic Clock Control |
| | AD[31:0] | 32 | BI | PCI | PCI | PCI Address and Data Bus |
| | CBEN[3:0] | 4 | BI | PCI | PCI | PCI Command/Byte Enable signals |
| | PAR | 1 | BI | PCI | PCI | PCI Bus Parity |
| | FRAMEN | 1 | BI | PCI | PCI | PCI Frame, Active low. |
| | TRDYN | 1 | BI | PCI | PCI | PCI Target Ready, Active low. |
| | IRDYN | 1 | BI | PCI | PCI | PCI Initiator Read Signal, Active low. |
| | STOPN | 1 | BI | PCI | PCI | PCI STOP Transfer Control Signal, Active low. |
| | DEVSELN | 1 | BI | PCI | PCI | PCI Target Device Select Not |
| | IDSEL | 1 | IN | | PCI | PCI Device Select for Configuration |
| | REQN | 1 | TRI | PCI | | PCI Bus Request Not |
| | GNTN | 1 | IN | | PCI | PCI Bus Grant Not |

*FIG. 3A1*

| | | | | | |
|---|---|---|---|---|---|
| PERRN | 1 | BI | PCI | | PCI Parity Error Report Signal, Active low. |
| SERRN | 1 | OD | PCI | TBI | PCI System Error Report, Active low. |
| INTAN | 1 | OD | PCI | TBI | PCI Interrupt, Active low, Level sensitive |
| CLK512 | 1 | IN | PCI | 5V | 24,576 MHz Clock from AC97 Oscillator |
| TEST | 1 | IN | | 5V | ST | Active High Pin initiates Manufacturing Test |
| PLLGND | 1 | PWR | | | Analog Ground for Clock PLL |
| PLLPWR | 1 | PWR | 3.3V | | Analog Power for Clock PLL |
| VDD | 12 | PWR | 3.3V | | Chip Power (3.3V) |
| PCIVIO | 7 | PWR | | | PCI I/O Buffer Power (3.3/5V) |
| VSS | 18 | PWR | | | Chip Ground |
| BIAS5V | 1 | PWR | | 5V | Bias for 5V Tolerant Inputs |
| Total Pins | 144 | | | | Signal I/O=96, P/G=40, N/C=8 |

Table 12 EMU8010 I/O Signal Definitions

Nomenclature:

| | |
|---|---|
| IN | Input |
| OUT | Output |
| BI | Bi-directional |
| TRI | Tri-state |
| OD | Open Drain |
| ST | Schmidt Trigger |
| PWR | Power |
| NC | No Connect |
| PU | Pull Up |
| TBI | Input only in PNAND test mode |

*FIG. 3B*

EEPROM Interface Timing

V32A CODEC "Creative" Mode Audio Interface Timing

V32A CODEC Mixer Write Timing

V32A CODEC "Creative" Mode Audio Interface Timing

V32A CODEC "Creative" Mode Audio Interface Timing

AUDIO EFFECTS PROCESSOR INTEGRATED ON A SINGLE CHIP WITH A MULTIPORT MEMORY ONTO WHICH MULTIPLE ASYNCHRONOUS DIGITAL SOUND SAMPLES CAN BE CONCURRENTLY LOADED

STATEMENT OF RELATED APPLICATIONS

The following two commonly-owned applications are being filed concurrently and each is incorporated herein by reference in its entirety for all purposes:

"AUDIO EFFECTS PROCESSOR HAVING DECOUPLED INSTRUCTION EXECUTION AND DELAY MEMORY SEQUENCING," Steven Hoge inventor (Ser. No. 08/887,362, still pending); and "PROCESSOR WITH INSTRUCTION SET FOR AUDIO EFFECTS," Steven Hoge inventor (Ser. No. 08/886,920, still pending).

BACKGROUND OF THE INVENTION

The present invention relates to audio effects processors, and more particularly to such processors integrated on a single chip with multiple audio streams.

Audio signal processors are typically included on a sound board or multi-media board in a computer. Such a board will typically connect to the backplane bus and communicate with the host microprocessor. Typical functions included on such a board are the synthesizing of sound, such as by frequency modulation, and the storing and manipulation of audio sound samples. In addition, such boards will typically have a joystick connector for use with video games or other applications. In addition, connectors are provided for a microphone, line-in, a CD-ROM player, speakers, line-out, and a MIDI port.

Typically, multiple chips are included on such a board, such as not only the sound processing chip, but a separate signal processor, a mixer chip for mixing multiple audio signals, a CODEC or one or more analog-to-digital (ADC) and digital-to-analog (DAC) converters, and a frequency modulation sound synthesizing chip (FM chip).

Typically, the mixer would mix sounds in their analog form, with any digital processing being converted to analog form before being provided to the mixer. In addition, the digital processing chip would typically handle one audio stream at a time due to the need to synchronize with a particular audio stream. Digital audio signals may vary slightly, and the signal processing chip may have a phase lock loop (PLL) circuit for synchronizing to the data rate being provided to the chip. When a switch over to another audio source is done, the PLL resynchronizes to the new source.

Digital audio information and other data, such as joystick signals, can be provided to the host processor over the system host bus. One typical type of bus is the PCI bus. The PCI bus includes a standard protocol and requires certain information from any peripheral connected to it for handshaking and identification purposes. Typically, such information is stored in registers in the peripheral device. Included in such information is data identifying a particular board vendor, for instance. Accordingly, manufacturers of sound processing chips will typically have these registers programmed by an EEPROM chip encoded by the particular OEM vendor.

With the increasing demands on sound capabilities with today's computers, it is desirable to have a sound processor which can handle more data streams while minimizing the amount of circuitry required to handle the streams and the number of support chips needed.

SUMMARY OF THE INVENTION

The present invention provides a sound processor integrated on a single chip with multiple digital sound sample stream inputs. Each input is independently connected to separate ports of a multi-port memory. The architecture allows multiple, asynchronous digital sound sample streams to be concurrently loaded into the memory without requiring synchronization to any particular stream.

In a preferred embodiment, the multi-port memory also receives sound sample data from a host processor through an intermediate sound engine. In addition, up to three streams of digital data can be resampled from the multi-port memory and fed back to the host, preferably over a PCI interface.

In another aspect of the present invention, the PCI configuration registers have default values so that an EEPROM is not required unless those values are desired to be changed. The use of the default values is preferably indicated by tying high or low a pin for receiving serial data from the EEPROM. Additionally, pulling this pin high or low is used to enable or disable the joystick port, respectively. Finally, the ring and LCS pins for the modem connection can be pulled low to disable the modem. Accordingly, the invention makes multiple use of certain pins to limit the need for additional circuitry.

For a further description of the nature and advantages of the invention, reference should be made to the following description taken in conjunction with the accompanying drawings.

BRIEF DESCRIPTION OF THE DRAWINGS

FIGS. 3A and 3B are a listing of the pin assignments for the chip of FIG. 1.

DESCRIPTION OF THE PREFERRED EMBODIMENT

Figure 1:
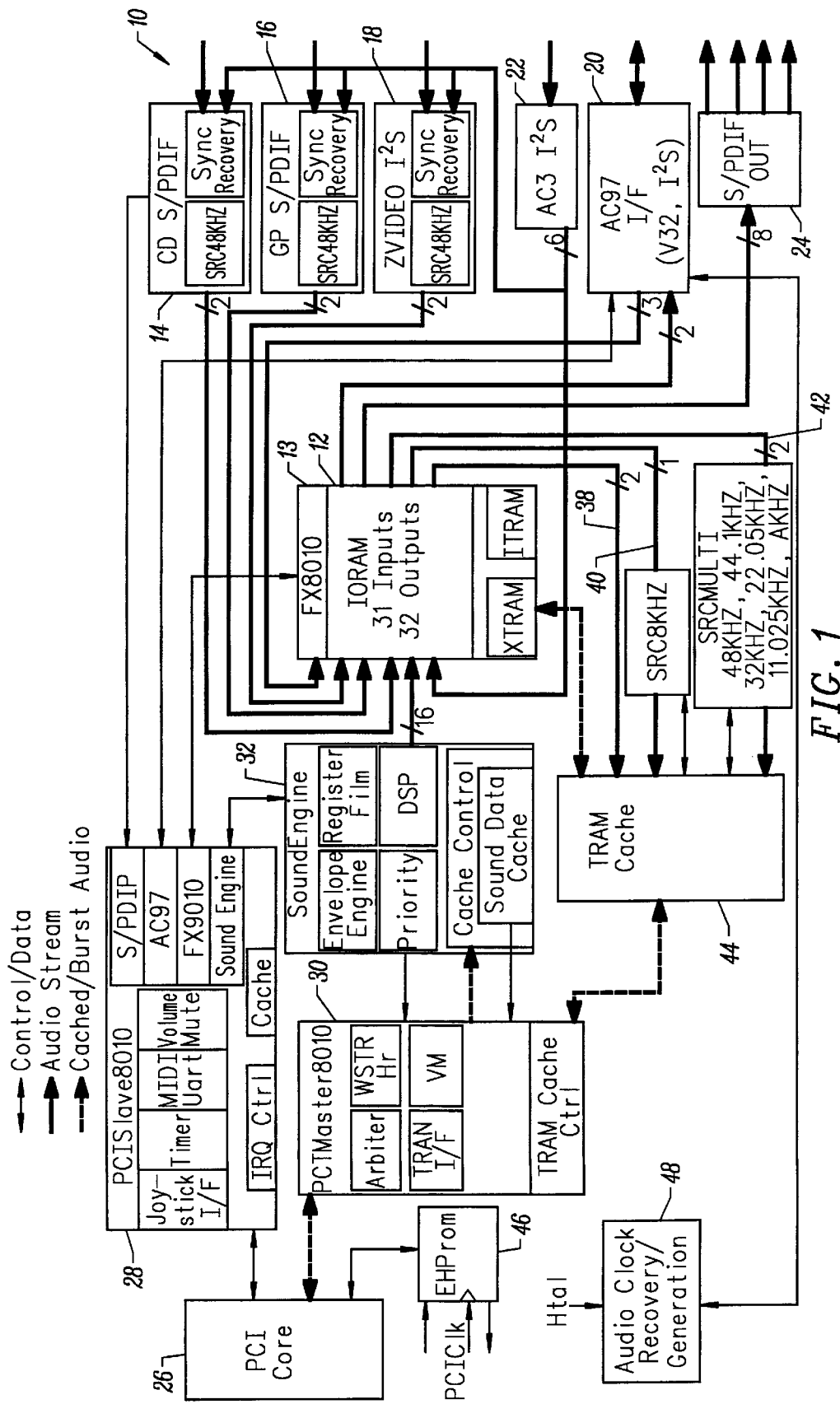
FIG. 1 is a block diagram of an audio processor chip according to the present invention.

FIG. 1 is a block diagram of a sound processor chip 10 according to the present invention. At the center of the chip is a multi-port RAM memory 12, which is used by a special purpose digital signal processor optimized for enhancing audio, called the effects engine 13. A number of buffer interfaces for digital audio sample sources connect directly to ports of memory 12. These interfaces include a CD-ROM SPDIF interface 14, a general purpose SPDIF interface 16, a ZVIDEO Audio I²S interface 18 and a CODEC or ADC/DAC interface 20. Optionally, an interface 22 for a AC-3 audio decompression and decoding chip is included. Finally, six or eight channels of SPDIF output to interface 24 are provided to four output pins.

Memory 12 can also receive sound samples from a host memory. The interface with the host memory is over a PCI bus through a PCI interface core 26. PCI slave circuitry 28 and master circuitry 30 connect to interface 26. Sound samples can come in through PCI bus master 30 to a sound engine 32 for processing, and from there can be stored in memory 12.

In addition, a resampling path is provided through three resampling streams 38, 40, and 42 to a tank RAM cache (TRAM) 44.

Also provided is an EEPROM interface 46 for providing default configuration register and other register values from an external EEPROM for the PCI register values. In addition, an audio clock recovery circuit 48 is provided.

Figure 2:
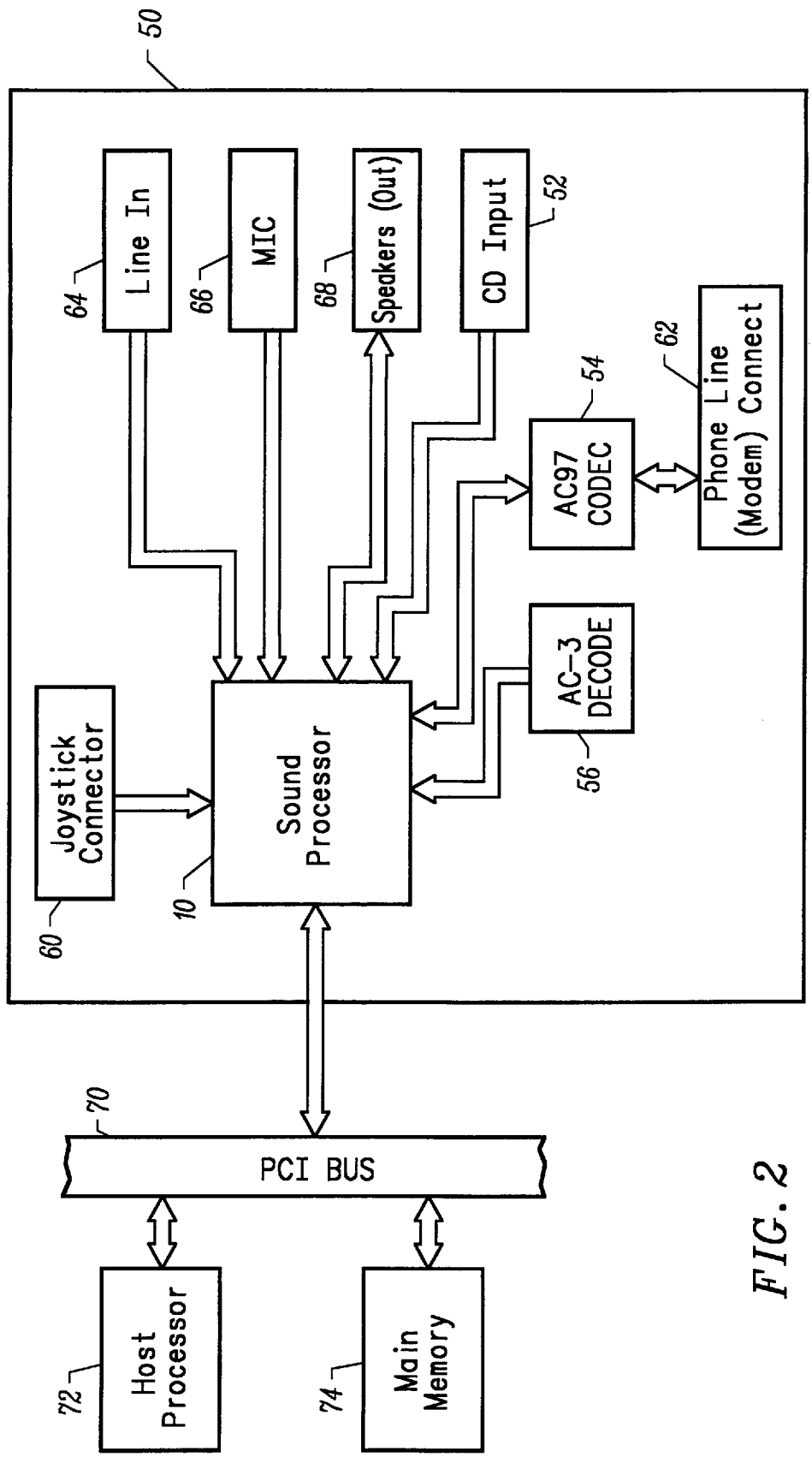
FIG. 2 is a block diagram of a sound board onto which the audio processor chip of FIG. 1 could be incorporated.
Figure 4:
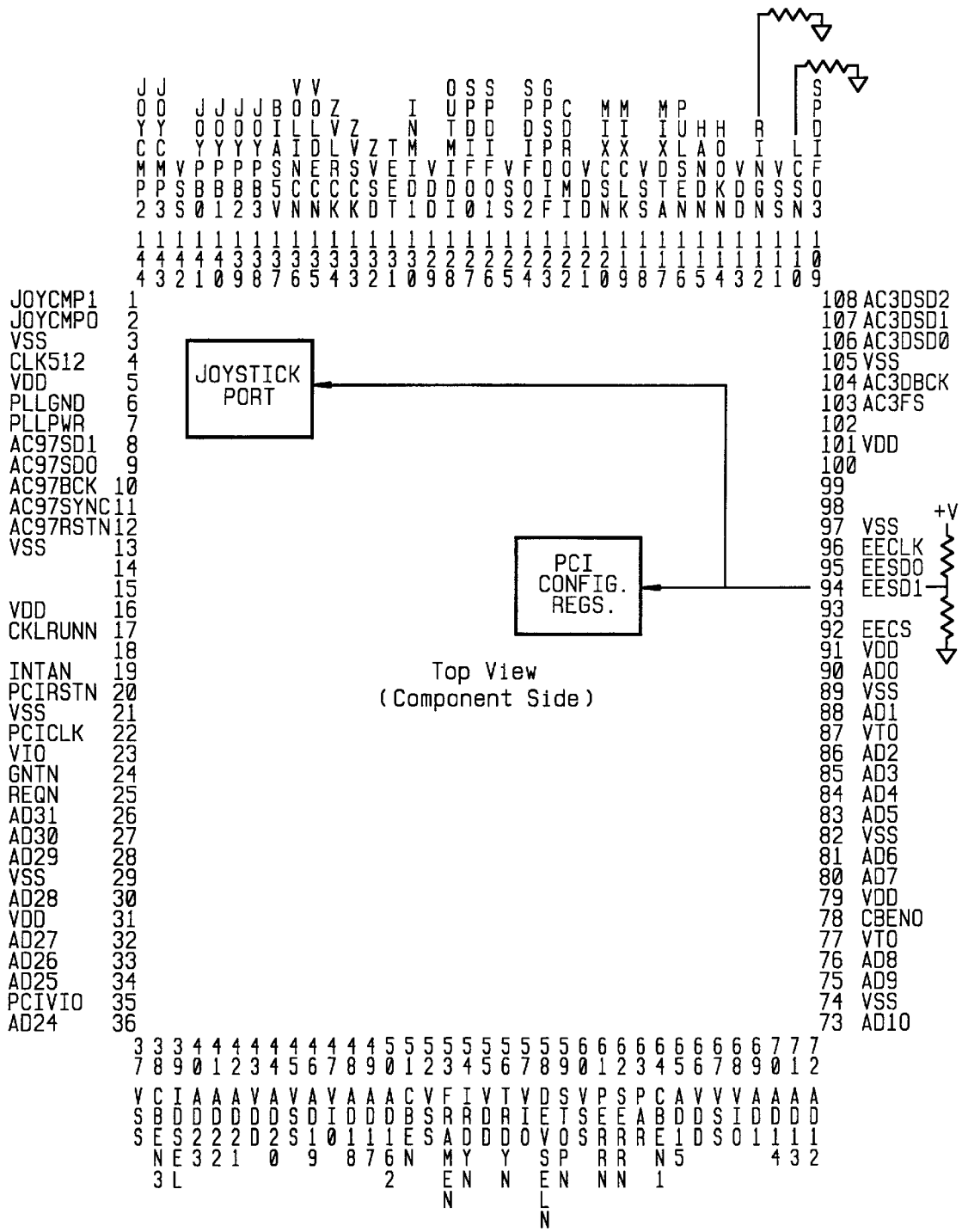
FIG. 4 is a diagram illustrating the location of different signals on the pins of the chip of FIG. 1.

FIG. 2 illustrates a typical sound board on which an integrated circuit according to the present invention may be mounted. Sound processor chip 10 is shown mounted on a circuit board 50. Shown is a CDROM connector 52 which couples to interface 14 of chip 10. Also shown is an AC97 CODEC 54 which would connect to interface 20 of FIG. 1. An optional AC-3 audio decompressor/decoder 56 is shown for connecting to interface 22. If an AC-97 CODEC is not used, discrete components may be substituted, including a CODEC or separate A/D and D/A converters and a mixer chip.

Also shown are various other connections to sound processor chip 10, including a joystick connector 60, a phone line connection for a modem 62, a line in connector 64, a microphone connector 66, and a speaker output 68. In addition, a connection to a PCI bus 70 is shown. Bus 70 connects to the host microprocessor 72 and to main memory 74.

AUDIO I/O OVERVIEW

Audio I/O is accomplished by mapping I/O channel buffers into the processor's general purpose register (GPR) address space in memory 12. On each sample period, signals from the input channels appear in the input GPRs, and the contents of the output GPRs are written to output channels. The GPR-mapping allows I/O channel buffers to be used just like a GPR operand in any instruction of the effect engine, with no restriction on reading or writing.

In general, audio I/O is multi-buffered, so that all samples arrive and depart from the effects engine 13 synchronously. This means that input and output signals for any I/O channel can be read or written at any time during the sample period (i.e., from any instruction step) and the signals are guaranteed to "belong" to the same sample period.

Another feature of the I/O architecture is that the same logical input and output channels share a common GPR location. This means that when a signal flows in on a particular channel, it will also flow out on that channel if not altered by any instructions. Thus there is no instruction overhead associated with simply moving signals through the effects engine; if not otherwise programmed, the effects engine acts as a digital "wire" for the multi-channel audio stream flowing through it. In fact, this is its default reset behavior.

The overall structure of audio signal flow is shown in FIG. 1. The effects engine 13 and memory 12 can be seen at the center of this signal flow; it collects 16 audio channels from the SoundEngine 32 as well as five additional streams from external audio interfaces. The corresponding 21 output channels can be routed back to external interfaces as well as to host memory, via the PCI bus.

A number of audio paths are running synchronously at a (nominal) 48 KHz sample rate clock derived from the AC97 CODEC. This includes the sound engine 32, effects engine 13, AC97 CODEC interface 20 and S/PDIF outputs 24. However, the interfaces also includes hardware to perform sample-rate conversion to or from the local 48 KHz rate on several other audio paths. These other paths can interface with memory 12 through buffers in the interface. These interfaces include CD-ROM interface 14, general purpose SPDIF interface 16, and ZVIDEO interface 18.

All audio sources are 16 bits wide, and are left-justified into the MSB position of the memory 12 GPRs; the least significant bits will be zero-filled. Similarly, outputs are also 16 to 20 bits wide from the same portion of the 32 bit wide GPR words. Output GPRs are simply truncated before being passed out of the memory 12; if desired, dithering can be performed in microcode before the truncation occurs in hardware. A special GPR-mapped dither noise source is provided for this.

Inputs

Sound Engine. The sound engine 32 is a 64-channel version of the prior EMU8000 wavetable synthesis engine. One difference is that any four of 16 output channels can be selected as the destinations for each synthesizer voice, with (smoothed) variable scaling on each of the four ends. The 16 synthesizer output channels become 16 input channels to the sound effects engine 13.

AC97. The AC97 interface supplies two (optionally three) audio input channels at 48 KHz. In fact, the system clock is usually derived from a clock shared by an AC97 CODEC; thus the AC97 is the sample rate master for the entire system.

In AC97 parlance, the three channels are known as the optional microphone (mono) and ADC (stereo) channels. The 48 KHz microphone channel comes into memory 12 on the same channel that is sent out to the 48 KHz to 8 KHz sample-rate converter in feedback path 42 to the PCI interface, so that no instructions are required to route this signal.

Microphone Recording. The AC97 CODEC optionally contains a third ADC which is intended for use as a monophonic microphone input. Data from this ADC channel is routed at 48 KHz into the effects engine on input channel 20. The corresponding effects engine output channel 20 is routed into a sample rate converter which will convert the 48 KHz monophonic channel into an 8 KHz monophonic data stream. If the microphone buffer size register (MBS) is programmed to a non-zero value, this data stream is transferred to a host memory beginning at the microphone buffer base address (MBA). Audio data is accumulated in a FIFO, then transferred to the host memory buffer in a burst. When half the programmed buffer size is reached, an interrupt will occur if the MBIE interrupt enable bit in the interrupt enable (IE) register is set. A second interrupt will occur when the end of buffer is reached, at which time additional data will subsequently be transferred at the start of the buffer. Transfer of data will continue until the MBS is set to zero.

AC97 ADC Audio Input Recording. The AC97 CODEC contains a stereo ADC producing a stereo digital audio stream at 48 KHz which is routed to the effects engine on two channels for the left and right streams respectively. The corresponding effects engine output feeds a stereo sample rate converter, whose output can be written to a buffer in host memory. The output rate of the sample rate converter is determined by the ADC sample rate/stereo control register (ADCSR). This register also controls which channels will be written to host memory. A transfer to host memory will occur as long as at least one channel is enabled for write in the ADCSR register, and the ADC buffer size register (ADCBS) is non-zero. If both channels are enabled for writing to the host, the transfer will always occur as pairs of interleaved left and right 16 bit audio data words, with the left word at the lower address. The transfer is enable, beginning at the ADC buffer base address (ADCBA) by writing a non-zero buffer size into the ADCBS register. Audio data is accumulated in a FIFO, then transferred to the host memory buffer in a burst. When half the programmed buffer size is reached, an interrupt will occur if the ADCBIE interrupt enable bit in the interrupt enable (IE) register is set. A second interrupt will occur when the end of buffer is reached, at which time additional data will subsequently be transferred at the start of the buffer. Transfer of data will continue until the ADCBS is set to zero.

(CD-ROM) S/PDIF. The CD-ROM S/PDIF input on interface 14 is a sample rate converted, typically from 44.1 KHz to 48 KHz, and routed to two input channels. This is intended to be the digital audio output from a CD-ROM drive playing audio tracks, although the input can accept S/PDIF data from any source.

GP S/PDIF. The GP S/PDIF input on interface 16 is sample rate converted to 48 KHz, and routed to two input channels. This general purpose accepts digital audio output from any device producing S/PDIF format data.

ZVIDEO I$^2$S. The ZVIDEO I$^2$S input on interface 18 is sample rate converted, typically from 22, 44, or external 48 KHz to the local 48 KHz rate, and routed to two input channels. This is intended to be the digital audio output from a ZVIDEO PCMCIA (PC-CARD) device, although the input can accept I$^2$S data from any source.

AC-3 I$^2$S. The AC-3 I$^2$S input on interface 22 is asynchronously sample rate converted, typically from 22, 44, or external 48 KHz to the local 48 KHz rate, and routed to six input channels. This conversion shares the same sample rate converter used by CD SPDIF interface 14, GP SPDIF interface 16 and Z video interface 18.

The AC-3 interface will be enabled by setting a bit in the Hardware Control Register. An additional bit will control whether two channel or six channel data is accepted. When disabled, the AC-3 data will be ignored by the chip. When enabled in two channel mode, the AC-3 interface will take over the Z video interface, and simply route the AC-3 stereo audio to that interface. Any data appearing at the Z video inputs will be ignored. When enabled in six channel mode, the AC-3 interface will take over the Z video, the CD audio, and the GP SPDIF interfaces. Channels 0 and 1 will be routed to the Z video interface, channels 2 and 3 to the CD audio, and channels 4 and 5 to GP SPDIF input. Data applied to the Z video inputs will be ignored; data applied to the CD audio and GP SPDIF inputs will be correctly reflected in the associated channel status registers and associated inputs, but the audio portion of these interfaces will instead present the AC-3 data. Only 16 bits of data will be presented. This is intended to be the digital audio output from any external AC-3 audio decoder, although the input can accept from two to six channel I$^2$S data from any source.

Outputs

AC97. The memory 12 supplies two channels back to the same AC97 interface that is the source of the three input channels and is synchronous with the master sample clock. These two channels, running at 48 KHz, are considered the "main" stereo outputs derived from the various input sources via an output mixing and assignment architecture implemented in microcode.

S/PDIF Output Channels. Six output channels are routed to four auxiliary stereo S/PDIF output channels through interface 24. These auxiliary channels run at 48 KHz only, and may be considered to comprise a multi-track "pro audio" interface to multi-track mixers or surround-sound playback systems. This enables a class of 8-track professional audio applications.

Effects Engine Output Recording. Any or all of the effects outputs can be written at their native 48 KHz sample rate to a buffer in host memory. The effects engine write channel (FXWC) register controls which channels will be written to host memory. A transfer to host memory will occur as long as at least one channel is enabled for write in the FXWC register, and the effects engine buffer size register (FXBS) is non-zero. If more than one channel is enabled for writing to the host, the transfer will comprise interleaved groups of 16 bit audio data words, with the lowest channel at the lowest address. If the number of channels to be transferred is two, four, or eight, then the transfer will always result in the same number of samples for each channel; if any other number of channels is selected this is not guaranteed to be true, and the stream should be appropriately truncated by computing its size. The transfer is enabled, beginning at the effects engine buffer base address (FXBA) by writing a non-zero buffer size into the FXBS register. Audio data is accumulated in a FIFO, then transferred to the host memory buffer in a burst. When half the programmed buffer size is reached, an interrupt will occur if the FXBIE interrupt enable bit in the interrupt enable (IE) register is set. A second interrupt will occur when the end of buffer is reached, at which time additional data will subsequently be transferred at the start of the buffer. Transfer of data will continue until the FXBS is set to zero. All transfers of data to the host memory are 16 bit wide audio samples. However, the effects engine can process audio data up to 32 bits wide, and many of the input audio sources can supply 20 bit audio data. By programming the effects engine to split a wider audio word into two outputs representing the most significant and least significant parts of a 32 bit audio sample, the facilities described above can be used to transfer 32 bit audio data into host memory when required, using two output channels for each 32 bit audio data stream.

Multi-track Resampling

Using the Effects Engine Output Recording, any or all of the 32 effects outputs can be sent to host memory. This mode of operation can be used to implement a multi-track digital audio recorder when combined with the S/PDIF output channels. The S/PDIF output channels represent the audio output of the recorder, while the effects outputs being transferred to host memory represent the input being recorded into memory, and from there onto the computer's hard disk for later playback.

Multi-Stream Recording. In addition to the effects engine output, two other streams can be sent back over the PCI bus to independent buffers in host memory. These streams consist of:

A monophonic sample stream sample rate converted from the local 48 KHz rate to 8 KHz (the AC97 "microphone" channel). The reduced data rate will ease host data processing when the wide bandwidth is not required, for example for telephony or speech recognition applications.

A stereo sample stream converted to any of the following rates: 48 KHz, 44.1 KHz, 32 KHz, 24 KHz, 22.05 KHz, 16 KHz, 11.025 KHz, or 8 KHZ.

Output Mixing. With a total of 21 channels flowing through memory 12 from a variety of sources, there are many possible approaches to an output mixing and channel routing architecture. The best choice will depend upon the specific applications for which the invention is used. The default output mixer and channel router is implemented in hardware, and simply passes each input channel to each output channel. Any other strategy requires a mixer implemented in the effects engine by means of appropriate microcode.

External Interface Timing

Clocks. The PCI interface logic operates on the PCI clock and is synchronous with the PCI bus. The sound engine, effects engine, and other portions of the audio processing subsystem on the chip operate on a 1024×sample rate clock which is derived from and phase locked to the CLK512 input from the AC97 chip, which is the same 512×sample at a 48 KHz sample rate or 24.576 MHz (40.7 ns period) CLK512. Internally, the audio clock is used for any functions requiring precise timing, because the PCI clock frequency is not known. There are asynchronous interfaces between the PCI bus logic and the audio processing subsystem, which are accommodated by the internal design.

PCI Interface. The PCI interface logic is designed to meet all PCI specification 2.1 timing constraints. The maximum PCI clock frequency is 33 MHz. The INTAN signal is asynchronous in nature and does not have any timing constraints.

Joystick Interface Timing. The joystick pushbutton inputs are polled when read by the host. No setup or hold time is guaranteed. The joystick comparator pins are analog in nature, and are designed to be compatible with existing analog joystick circuits. No timing specifications beyond this functionality are implied.

MIDI Interface Timing. The MIDI interface timing complies with the MIDI 1.0 specification. The actual baud rate is based on the nearest convenient integer divisor of the 24.576 MHz clock rate, in this case 784, giving 31.35 kbaud.

CD-ROM SPDIF Input Timing. The CD-ROM SPDIF input is designed to accept an IEC-958 compliant signal at a frequency of 32 KHz to 48 KHz +1/−10%.

General Purpose SPDIF Input Timing. The general purpose SPDIF input is designed to accept an IEC-958 compliant signal at a frequency of 32 KHz to 48 KHz +/−10%.

Volume and Mute Input Timing. The volume and mute control inputs to the memory 12 are designed to be directly connected to SPST pushbuttons to ground. These inputs will accept noisy or bouncy signals whose bounce duration is less than 50 msec. The maximum delay from switch closure to interrupt is 10 msec.

Figure 6:
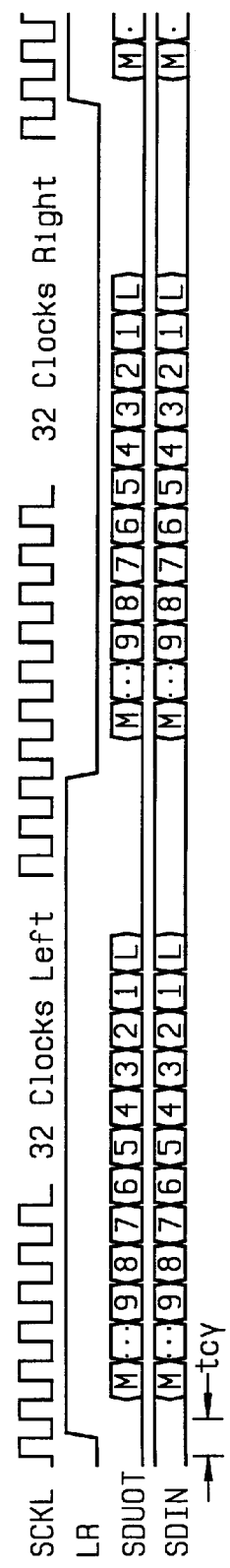

Generic 12S CODEC Interface Timing. The timing diagram of FIG. 6 illustrates the serial audio data interface when in "Generic 12S" mode.

MCLK runs at four times SCLK, with coincident rising edges. MCLK runs at 256 times the 48 KHz sample rate, SCLK at 64 times the sample rate, LR at the sample rate. LR and SDOUT transition coincident with SCLK falling edges. SDIN is sampled on SCLK rising edges. The MSB of SDOUT and SDIN occurs one bit cell after the LR transition. A total of 20 bits are supplied on SDOUT, with the remaining 12 locations stuffed with zeros. A total of 20 bits are recognized on SDIN, with the remaining 12 locations ignored.

Figure 7:
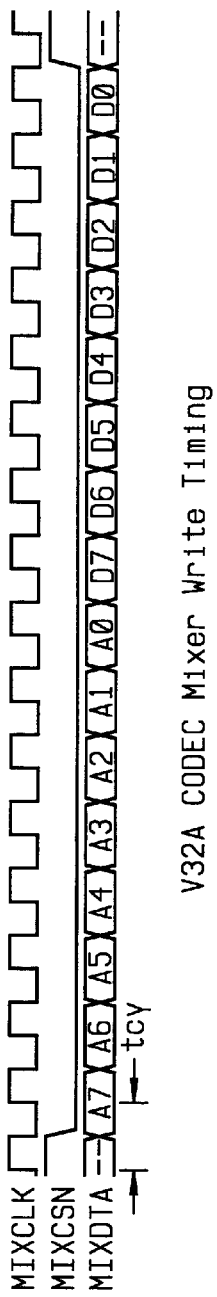

V32A Interface Timing. The chip 10, when configured for operation with the V32A, meets the specification of the Creative V32A CODEC, version 0.10. The timing diagram of FIG. 7 illustrates the mixer interface timing during write.

Tcy is nominally 81.38 nsec, with nominally 50% duty cycle. MIXCLK (from pin AC97RSTN) falling edge is coincident with MIXCSN and MIXDTA transitions.

Figure 8:
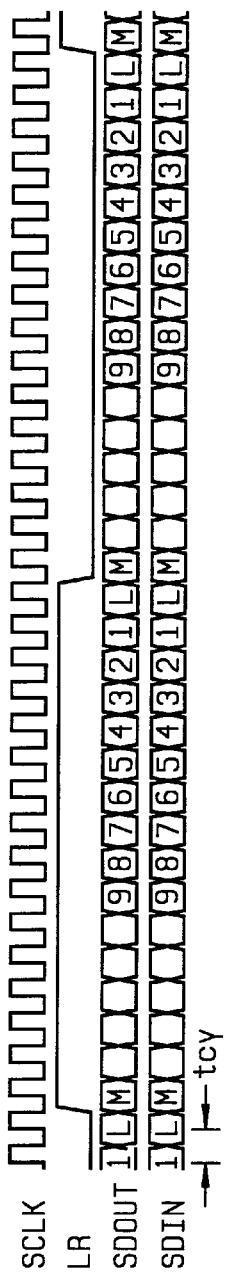

The timing diagram of FIG. 8 illustrates the serial audio data interface to the V32A in "Creative" mode.

MCLK runs at eight times SCLK, with coincident rising edges. MCLK runs at 256 times the 48 KHz sample rate. SCLK at 32 times the sample rate, LR at the sample rate. LR and SDOUt transition coincident with SCLK falling edges. SDIN is sampled on SCLK rising edges.

Figure 9:
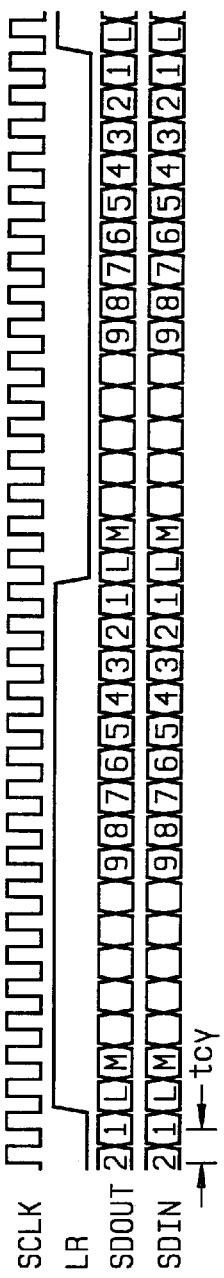

The timing diagram of FIG. 9 illustrates the serial audio data interface to the V32A in "12S" mode.

Operation in this mode is identical with "Creative" mode except that both SDOUT and SDIN have been shifted one bit later in time to correspond with the 12S format.

AC97 Interface Timing. The AC97 interface is designed to meet the specifications of the AC97 specification, revision 1.00.

EEPROM Interface. The load time of the EEPROM is less than 10 msec, which occurs within "initialization" time on the PCI spec, and therefore does not have to meet the eight or 16 clock rules. If configuration space is accessed prior to completion of EEPROM load, excessive wait states will result, but this is within PCI 2.1 specifications.

Figure 5:
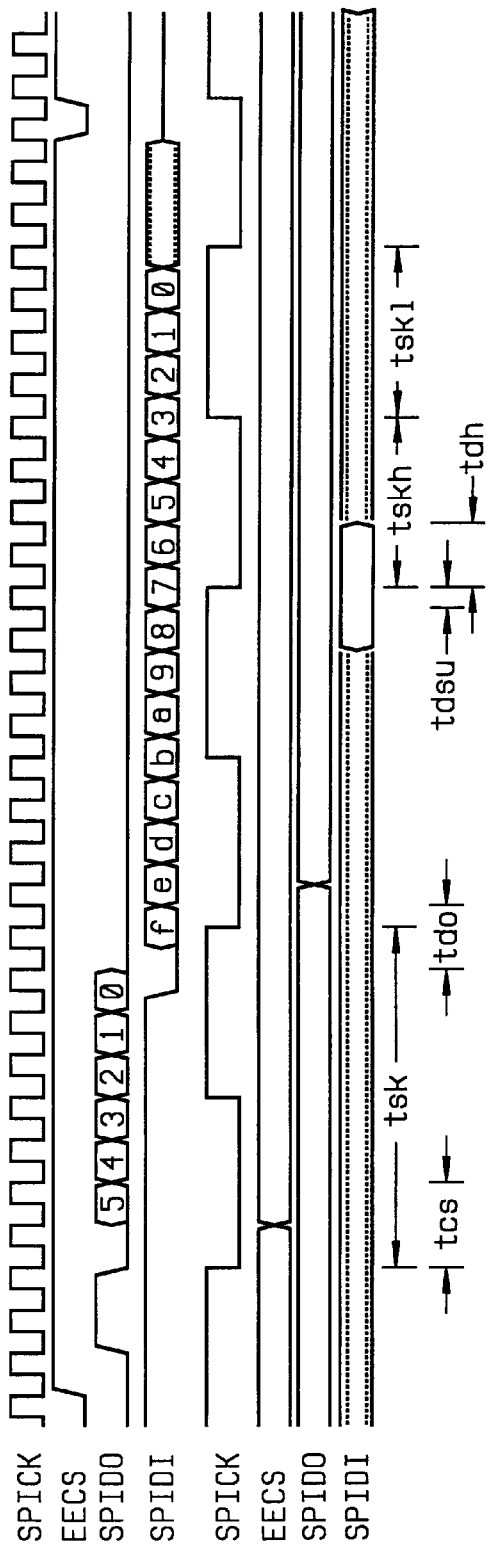
FIGS. 5–9 are timing diagrams for certain sound interfaces for a sound processor according to the present invention.

The chip 10 contains an interface 46 to a 93C46 type EEPROM, which is used on reset to configure the PCI interface. On the trailing edge of PCIRSTN, the EEPROM is read via the EEPROM serial interface, and the contents are used to establish the programmable PCI configuration registers. FIG. 5 shows the interface timing for the EEPROM. Note that if the SPIDI pin is resistively tied to either ground or the supply, the default values of the PCI configuration registers are used, thus enabling a "zero glue" usage of chip 10. Tying EESDI to ground will enable the joystick function. Tying it to the power supply will cause the joystick function to be disabled.

The format for the "FuncEnbs" bytes is a '1' in the bit position corresponding to the PCI function number to enable the function. Function 0 is always enabled. The values in bits 0, 3, 4, 5, 6, and 7 are don't care and conventionally zero, and the value in bit 1 indicates that the joystick is enabled (1) or disable (0), while the value in bit 2 indicates that the modem is enabled (1) or disabled (0).

NOTES:
1. The times provide for the standard 93C46 memory, and result in a complete read time for all 1024 bits of memory in less than 10 msec.
2. tSK is derived from the audio clock and is 50% duty cycle at 384 Khz.
3. After the EEPROM has been read, EECS will remain low until another PCI reset trailing edge occurs. Subsequent to this, SPICK, SPIDI and SPIDO could be used by other functions needing a serial interface such as the SPI interface.

Pin Descriptions

JOYPB[3:0]—These four input pins with pullups connect to the joystick push-buttons and receive their state.

JOYCMP[3:0]—These four Schmidt trigger input pins connect to the joystick pullup and capacitor network. When the joystick is triggered, these pins are output enabled and discharge the capacitor. The period of time until they return to a valid logic high is timed, and the count is used as the joystick axis value.

INMIDI—This input pin receives data intended for the sound processor chip's MIDI UART. The polarity is such that a start bit is a logic low level.

OUTMIDI—This input pin provides data from the MIDI UART. The polarity is such that a start bit is a logic low level. Note that to comply with the MIDI 1.0 specification, a buffering transistor must be used.

CDROMI—This input receives the SPDIF format digital audio data from the CD-ROM or other SPDIF digital audio source operating at a sample rate between 28 KHz and 53 KHz.

GPSPDIF—This input receives the SPDIF format digital audio data from a general purpose digital audio source operating at a sample rate between 28 KHz and 53 KHz.

SPDIFO[3:0]—These four output pins provide four stereo channels of SPDIF format digital audio data from the sound processor chip at a fixed 48 KHz rate.

VOLINCN—This input with pullup is connected to the volume increment push-button.

VOLDECN—This input with pullup is connected to the volume decrement push-button.

ZVSD—This input is the I²S format Zoomed Video serial data.

ZVSCK—This input is the I²S format Zoomed Video serial bit clock.

ZVLRCK—This input is the I² format Zoomed Video serial left/right word clock.

AC97BCK—This input receives the 12.288 MHz rate bit clock from the AC97 CODEC. When in other CODEC modes, this pin is unused.

AC97SDI—This input receives serial data from the AC97 or other CODEC.

AC97SYNC—This output provides the sync signal to the AC97 CODEC. When in other modes, this pin supplies the frame sync (Left/Right) signal to the CODEC.

AC97SDO—This output provides the serial data to the AC97 or other CODEC.

AC97RSTN—This output provides the reset signal to the AC97 CODEC. When in other modes, this pin supplies a 12.288 MHz clock, which will also serve as the MIXCLK for the V32A interface.

MIXCSN—This output provides the Chip Select to the V32A CODEC.

MIXCLK—Bit clock to the V32A CODEC.

MIXDTA—This output provides the Mixer Serial Data to the V32A CODEC.

EECS—This output provides the chip select signal to the external EEPROM.

EECLK—This output provides the serial clock signal to the EEPROM.

EESDO—This output provides the serial data signal to the external EEPROM during power on reset configuration.

EESDI—This input receives the serial data signal from the external EEPROM. If no EEPROM is used, this pin can be resistively pulled to power or ground. When the EEPROM read is attempted after the trailing edge of PCI reset, this passive state will respectively disable or enable the analog joystick interface function respectively.

AC3FS—This input is the I²S format left/right frame sync clock from the AC3 decoder for the decoded data streams.

AC3DBCK—This output is the I²S format bit clock to the AC3 decoder for the decoded audio data.

AC3DSD0—This input receives the left and right front channels in I²S format from the AC3 decoder.

AC3DSD1—This input receives the left and right surround channels in I²S format from the AC3 decoder.

AC3DSD2—This input receives the center and subwoofer channels in I²S format from the AC3 decoder.

PULSEN—This output supplies the host modem subscriber line interface "pulse" information.

HOOKN—This output supplies the host model subscriber line interface "hook" information.

HANDN—This output supplies the host modem subscriber line interface "hand" information.

LCSN—This input receives the host modem subscriber line interface "ics" information.

RINGN—This input pin receives the host modem subscriber line interface "ring" information.

PCICLK—This input is connected to the PCI "CLK" clock signal. The sound processor chip is specified to operate with PCI clock frequencies to 33 MHz.

PCIRSTN—This active ow input is connected to the PCI "RST#" reset signal. This signal activates manufacturing test modes in the sound processor chip when combined with other signals.

CLKRUNN—This bi-directional pin as an input warns the PCICLK will be stopped in four PCI clocks. As an open drain output the sound processor chip can signal that it needs more time before clock can be stopped.

AD[31:0]—These bi-directional pins are connected to the PCI "AD[31::0]" multiplexed address/data bus.

CBE[3:0]N—These active low bi-directional pins are connected to the PCI C/BE[3::0]# command/byte enable bus.

PAR—This bi-directional pin is connected to the PCI "PAR" parity pin.

FRAMEN—This active low bi-directional pin is connected to the PCI "FRAME#" cycle frame pin.

TRDYN—This active low bi-directional pin is connected to the PCI "TRDY#" target ready pin.

IRDYN—This active low bi-directional pin is connected to the PCI "IRDY#" initiator ready pin.

STOPN—This active low bi-directional pin is connected to the PCI "STOP#" stop pin.

DEVSELN—This active low bi-directional pin is connected to the PCI "DEVSEL#" device selected pin.

IDSEL—This input pin is connected to the PCI "IDSEL" initialization device select pin.

REON—This active low tri-state output pin is connected to the PCI "REQ#" bus request pin.

GNTN—This active low input pin is connected to the PCI "GNT#" bus grant pin.

PERRN—This active low bi-directional pin is connected to the PCI "PERR#" parity error pin.

SERRN—This active low open drain output pin is connected to the PCI "SERR#" system error pin.

INTAN—This active low open drain output pin is connected to the PCI "INTA#" interrupt A pin.

CLK512—This input pin connects to the AC97 CODEC Master oscillator, and receives a 24.576 MHz (512×48 KHz) clock, which will be used by the on-chip PLL to produce the internal audio clocks.

TEST—This input is asserted high to implement manufacturing test modes in the sound processor chip. This pad does not include a pull-down resistor so that IDDQ testing may be performed.

PLLPWR—This input pin supplies +3.3 V power to the internal clock PLL analog circuit block.

REFCAP—This input pin supplies decoupling for the internal clock PLL analog circuit block.

VDD—These power input pins supply +3.3 V power to the pads and core of the sound processor chip.

VIO—These power pins supply the PCI reflected wave buffers only. They can be either 3.3 or 5 V depending on the PCI signaling environment.

VSS—These power input pins supply ground to the pads and core of the sound processor chip.

BIAS5V—This power input pin supplies the bias voltage for the 5 V tolerant input pads not associated with the PCI bus.

As will be understood by those of skill in the art, the present invention may be embodied in other specific forms without departing from the spirit or essential characteristics thereof. Accordingly, the foregoing description is intended to be illustrative, but not limiting, of the scope of the invention which is set forth in the following claims.

What is claimed is:

1. A sound processor integrated on a single chip comprising:
   a multiport memory;
   a first digital sound sample input coupled to first port of said memory, wherein said first input is a CD ROM S/PDIF input;
   a second digital sound sample input coupled to a second port of said memory, wherein said second input includes a serial data input pin and a bit clock pin; and
   a third digital sound sample input coupled to a third port of said memory, wherein said third input is a Z video audio input having a serial data pin, a bit clock pin and a word clock pin;
   whereby multiple, asynchronous digital sound samples can be concurrently loaded into said memory.

2. A sound processor integrated on a single chip comprising:
   a multiport memory;
   first digital sound sample input coupled to a first port of said memory;
   a second digital sound sample input coupled to a second port of said memory; and
   a PCI host interface port, wherein said PCI host interface port includes PCI bus master signal lines for bus request and bus grant, and said PCI host interface port is configured for only big endian mode;
   whereby multiple, asynchronous digital sound samples can be concurrently loaded into said memory.

3. A sound processor integrated on a single chip comprising:
   a multiport memory;
   a first digital sound sample input coupled to a first port of said memory;
   a second digital sound sample input coupled to a second port of said memory;
   a data input line;
   a joystick input port; and
   a circuit coupled to said data input line and said joystick input port for disabling said joystick input port when said data input line is pulled high;
   whereby multiple, asynchronous digital sound samples can be concurrently loaded into said memory.

4. The sound processor of claim 3 wherein said data input line is an EEPROM input.

5. A sound processor integrated on a single chip comprising:
   a multiport memory;
   a first digital sound sample input coupled to a first port of said memory;
   a second digital sound sample input coupled to a second port of said memory;
   a PCI host interface port;
   a host FIFO buffer coupled to said host interface port; and
   a general purpose SPDIF data input coupled to said host FIFO buffer;
   whereby multiple, asynchronous digital sound samples can be concurrently loaded into said memory.

6. A sound processor integrated on a single chip comprising:
   a multiport memory;
   a first digital sound sample input coupled to a first port of said memory;
   a second digital sound sample input coupled to a second port of said memory;
   at least three SPDIF output lines;
   a CODEC compatible output port including
      a sync output line,
      a serial data output line, and
      a reset not output line; and
   a mixer compatible output port including
      a chip select not output line,
      a bit clock output line, and
      a serial data output line;
   whereby multiple, asynchronous digital sound samples can be concurrently loaded into said memory.

7. A sound processor integrated on a single chip comprising:
   a multiport memory;
   a CD ROM SPDIF input coupled to a first port of said memory;
   a second digital sound sample input including a serial data input line and a bit clock line, said serial data input line being coupled to a second port of said memory;
   a Z video audio input having a serial data pin, a bit clock pin and a word clock pin, said serial data line being coupled to a third port of said memory;
   whereby multiple, asynchronous digital sound samples can be concurrently loaded into said memory;
   a PCI host interface port including PCI bus master signal lines for bus request and bus grant, said PCI host interface port being configured for only big endian mode;
   an EEPROM data input line;
   a joystick input port;
   a host FIFO buffer coupled to said host interface port;
   a general purpose SPDIF data input coupled to said host FIFO buffer;
   a modem control port including a ring pin, a hook pin, an LCS pin, a hand pin and a pulse pin;
   a MIDI port including a MIDI UART input pin and a MIDI UART output pin;
   at least three SPDIF output lines;
   a CODEC compatible output port including
      a sync output line,
      a serial data output line, and
      a reset not output line; and
   a mixer compatible output port including
      a chip select not output line,
      a bit clock output line, and
      a serial data output line.

8. The sound processor of claim 7 further comprising:
   a circuit coupled to said EEPROM data input line and said joystick input port for disabling said joystick input port when said data input line is pulled high.

* * * * *